United States Patent
Stern

(10) Patent No.: US 9,010,821 B2
(45) Date of Patent: Apr. 21, 2015

(54) KEBOB TONGS

(71) Applicant: Robert Stern, Toms River, NJ (US)

(72) Inventor: Robert Stern, Toms River, NJ (US)

( * ) Notice: Subject to any disclaimer, the term of this patent is extended or adjusted under 35 U.S.C. 154(b) by 54 days.

(21) Appl. No.: 13/986,619

(22) Filed: May 20, 2013

(65) Prior Publication Data

US 2014/0339840 A1    Nov. 20, 2014

(51) Int. Cl.
*A47J 43/28*    (2006.01)

(52) U.S. Cl.
CPC ..................... *A47J 43/283* (2013.01)

(58) Field of Classification Search
CPC ....................................... A47J 43/283
USPC ........... 294/3, 5, 5.5, 11, 12, 13, 16, 61, 99.2, 294/118, 145; 99/421 A; 16/422
See application file for complete search history.

(56) References Cited

U.S. PATENT DOCUMENTS

| | | | | |
|---|---|---|---|---|
| 1,377,043 A * | 5/1921 | Wilson | ........................ | 99/421 A |
| 2,634,159 A * | 4/1953 | Agneberg | ..................... | 294/118 |
| 3,743,234 A * | 7/1973 | Pietrzak | ........................ | 249/203 |
| 4,073,533 A * | 2/1978 | De brey et al. | ................ | 294/118 |
| 6,155,162 A * | 12/2000 | Wang | ........................... | 99/421 A |
| 6,474,224 B1 * | 11/2002 | Natter | ........................ | 99/421 A |
| 7,448,660 B2 * | 11/2008 | Yamanaka et al. | ............... | 294/16 |
| 2003/0107226 A1 * | 6/2003 | Wang et al. | ..................... | 294/16 |
| 2004/0104586 A1 * | 6/2004 | Rose | ............................... | 294/16 |
| 2008/0179903 A1 * | 7/2008 | Tardif et al. | ..................... | 294/16 |

* cited by examiner

*Primary Examiner* — Dean Kramer
(74) *Attorney, Agent, or Firm* — Clifford G. Frayne

(57) ABSTRACT

Tongs for manipulating shish-kebob on a barbeque grill, the tongs having two arms, the two arms being in parallel relationship at an insulated handle end which includes the pivot point at one end, the arms diverging at the opposing end of the handle end, to form two opposing spaced apart arms having kebob engaging ends, each end having an aperture there through, the apertures engaging the ends of the skewer, the tongs then being compressed so that the kebob engaging ends engage the outer food items on the skewer preventing their rotation so that the kebob may be either flipped for even cooking on the opposing side, or removed from the grill for consumption without endangering the fingers of the user.

7 Claims, 5 Drawing Sheets

KEBOB TONGS

RELATED APPLICATIONS

Applicant claims the benefit of provisional application Ser. No. 61/741,420, filed Jul. 20, 2012.

BACKGROUND OF THE INVENTION

1. Field of the Invention

The present invention relates to barbeque tongs which are utilized to manipulate food items being grilled on an outdoor or indoor grill using wood, charcoal, or natural gas. In particular, the present invention relates to specifically designed tongs which are utilized to manipulate shish-kebobs so as to flip the shish-kebob from one side to the other to insure uniform cooking and to safely place and remove the shish-kebob from the grill without the threat of burning ones fingers.

2. Description of the Prior Art

Shish-kebobs are a popular food item to be cooked on a grill, particularly outdoors, in fair weather. The shish-kebob has its origins in the Middle East and Asia. It consists of a skewer onto which bite size pieces of meat, poultry, vegetables in the form of onions, peppers and the like, and carbohydrates, such as potatoes, are positioned. The skewers with the bite sized pieces of food in place, is then placed on a grill and heated. Preferably, the shish-kebob is cooked on one side and then flipped or rotated 180 degrees about the longitudinal skewer to insure even cooking of the food pieces on the opposing side before removal from the grill.

The skewers utilized for shish-kebob may vary. Typically, they are wooden sticks with points at the end which are soaked in water for a period of time before being utilized in an effort to prevent the wooden stick from searing or catching fire on the grill. Recent developments in the shish-kebob art include metal rods having a circular ring handle at one end for ease of manipulation. To add flavor to the food, lemon grass stalks, sugar cane, and rosemary sprigs are sometimes used as the skewer.

The one problem that arises with shish-kebobs is that in the cooking process, the food items which in most situations are irregular in shape, when secured to the skewer, will oftentimes rotate about the skewer to seek their lower center of gravity when one tries to manipulate the kebob to turn the kebob from one side to the other. This prevents the food items from being cooked uniformly on both sides. Efforts have been made to address this problem. One effort is to make the cross section of the skewer square or rectangular in shape to lessen the possibility of rotation of the food items. Another solution is to use two skewers to prevent such rotation of the food items. Another is to use a two pronged skewer having a single handle. These solutions have had some success, but the problem persists and further problems exist with respect to the individual flipping the shish-kebob and removing the shish-kebob from the grill. Regardless of the type of skewer used, it becomes hot during the cooking process and sometimes difficult to grasp and remove from the grill without singeing one's fingers.

Therefore, there has been a need for a mechanism which would allow an individual to safely flip or rotate a shish-kebob on the grill to insure even cooking on both sides and a method and apparatus for removing the shish-kebob from the grill once cooking is complete without the possibility of singeing or burning one's fingers on the skewer which has become heated as a result of the cooking process.

Applicant's kabob tongs address both of these problems successfully.

OBJECTS OF THE INVENTION

An object of the present invention is to provide for a novel designed tong for cooking and moving shish-kebobs on a barbeque grill, which allows the shish-kebob to be flipped accurately for even cooking on both sides.

A further object of the present invention is to provide for novel shish-kebob tongs for use with shish-kebob on the grill which allows the chef to move the shish-kebob about the grill and to remove the shish-kebob from the grill without a danger of singeing or burning the fingers.

SUMMARY OF THE INVENTION

Tongs for manipulating shish-kebob on a barbeque grill, the tongs having two arms, the two arms being in parallel relationship at an insulated handle end which includes the pivot point at one end, the arms diverging at the opposing end of the handle end, to form two opposing spaced apart arms having kebob engaging ends, each end having an aperture there through, the apertures engaging the ends of the skewer, the tongs then being compressed so that the kebob engaging ends engage the outer food items on the skewer preventing their rotation so that the kebob may be either flipped for even cooking on the opposing side, or removed from the grill for consumption without endangering the fingers of the user.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
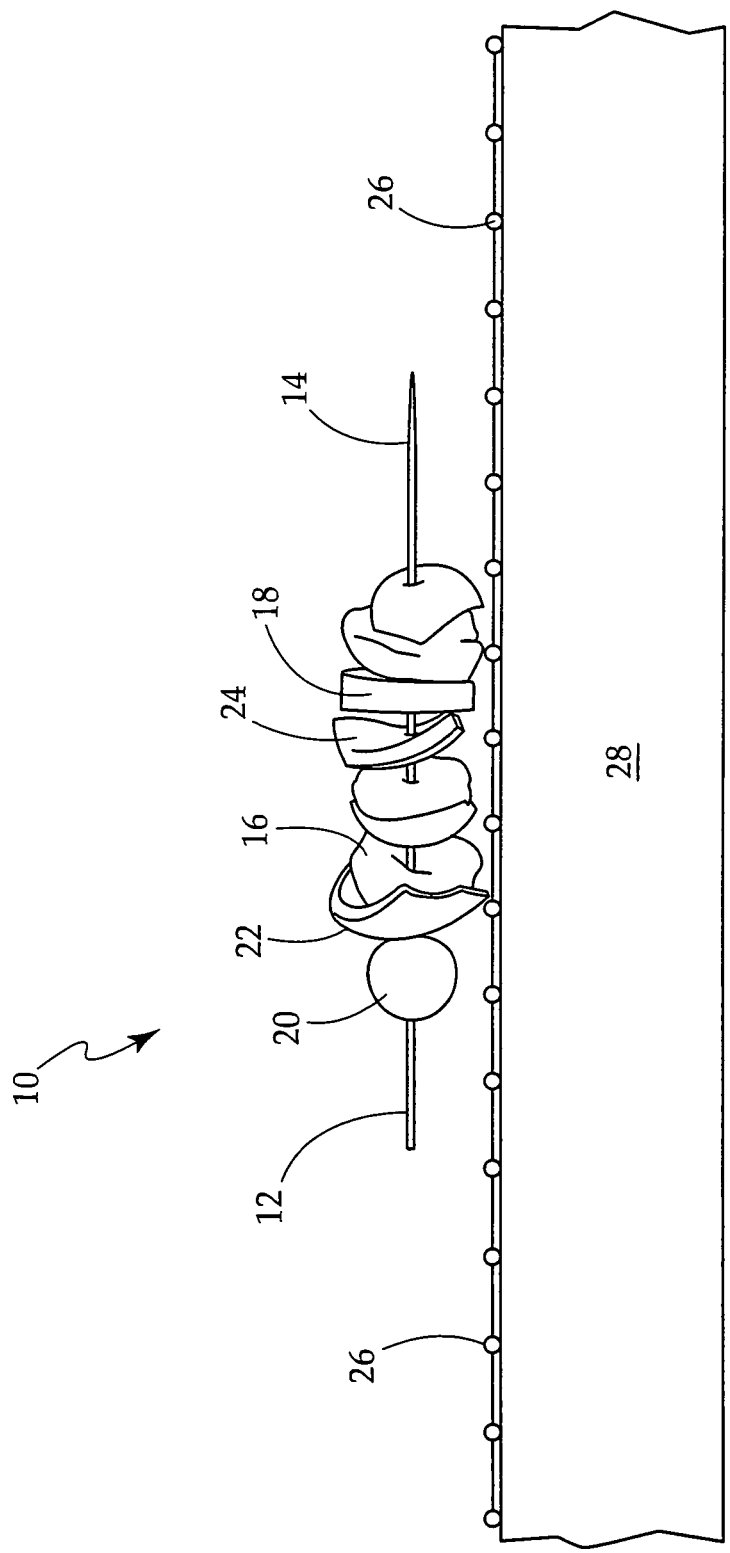
FIG. 1 is a side view of a typical shish-kebob resting on a grill surface.

FIG. 1 is a side view of a typical shish-kebob resting on a grill surface. The shish-kebob 10 comprises a skewer 12 illustrated as a wooden stick having a pointed end 14. Onto the shish-kebob there is punctured food items. In the shish-kebob illustrated in FIG. 1, the food items from left to right are meant to represent a portion of meat 16, onion 18, tomato 20, potato 22, meat 16, pepper 24, potato 22, tomato 20, onion 18, and meat 16. The skewer 12 as illustrated, would be made of wood and would have been soaked for a period of time before being placed on the grill. The grill or grate 26 rests above a source of heat 28, which may be propane, charcoal, or wood.

It is desirable to cook the shish-kebob 10 evenly on all sides. Therefore as shown in FIG. 1, once the food in proximity to the grate 26 is cooked, the individual would desire to lift the shish-kebob by means of skewer 12 and rotate it 180 degrees so that that portion of the food which is distant from the grate, would now be resting on the grate to insure uniform cooking and heat throughout the food. The problem is that the food on the skewer, tends to seek its lowest center of gravity and once having been heated on one side, tends to spin or rotate on skewer 12 making it difficult for the individual to facilely lift the skewer and rotate it 180 degrees so that the uncooked side of the food is now in proximity to grate 26. Additionally, it will be recognized that for rotating the skewer, the individual's fingers must come in contact with the skewer 12 and depending upon the heat of the fire, the skewer itself may have become hot or charred which could impart a singe or burn to the fingers of the chef.

There therefore has been a need for a facile way in which to pick up the shish-kebob and replace it on the grill so that the side distant from the grill in the initial cooking is now proximate to the grill or grate for uniform cooking.

Figure 2:
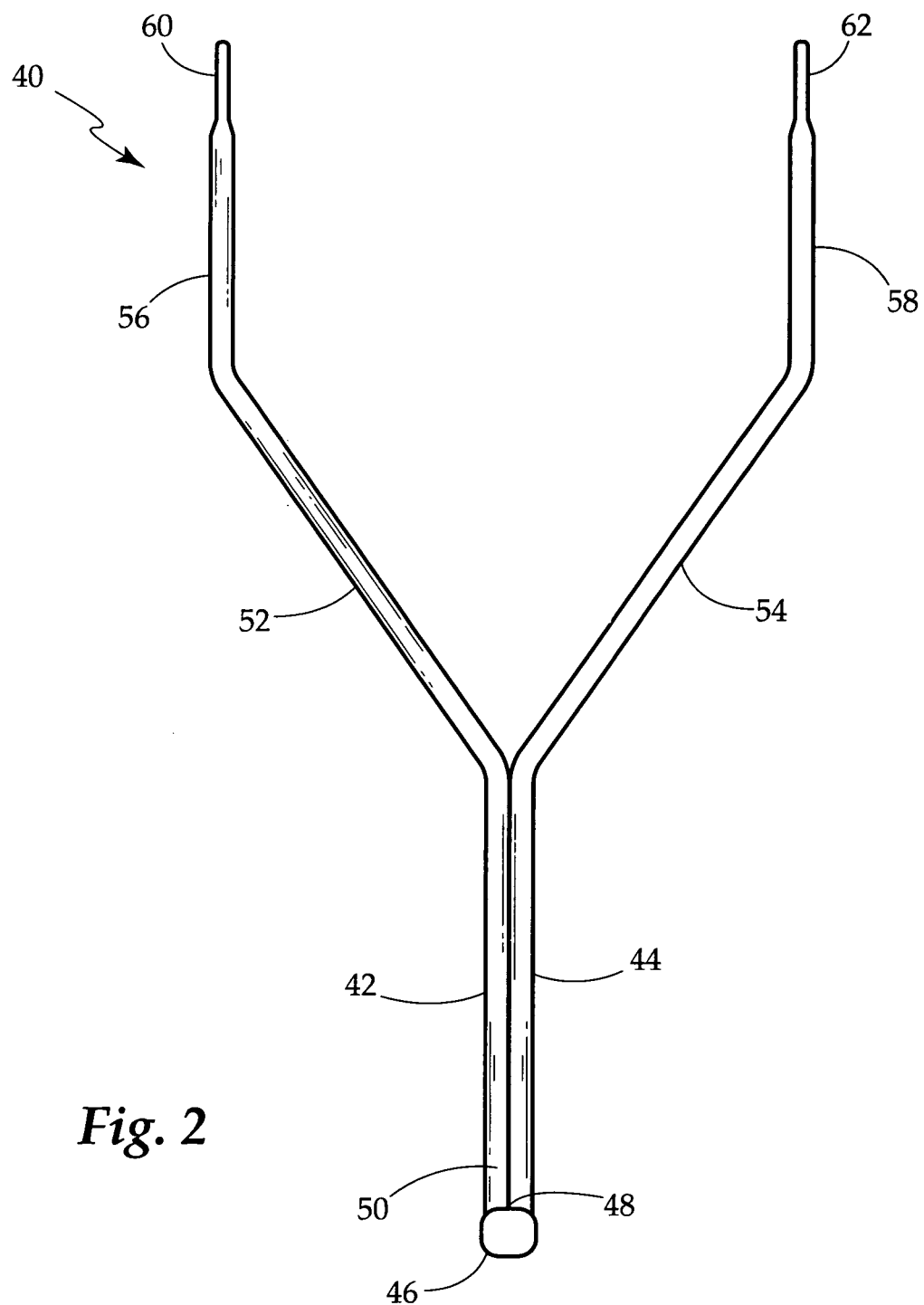
FIG. 2 is a top view of the shish-kebob tong of the present invention.

FIG. 2 is a top planar view of the shish-kebob tong 40 of the present invention. Shish-kebob tong 40 comprises two arms 42 and 44, each having three segments or legs. Arms 42 and 44 are joined at a pivot point 46 which may include a lockable, spring-loaded hinge 48. The initial arms 42 and 44 are parallel when in a closed, locked position, and form the insulated handle 50 of the shish-kebob tongs. Arms 42 and 44 become divergent at the end of handle 50, divergent legs 52 and 54 terminate in third legs 56 and 58 which are essentially parallel in the locked, closed position. Legs 56 and 58 terminate in shish-kebob engaging ends 60 and 62. Shish-kebob engaging ends 60 and resemble the ends of conventional tongs in that they are somewhat scalloped in their perimeter to aid in engaging food. Shish-kebob engaging ends 60 and 62 are designed to engage the skewer 12 of the shish-kebob and to engage the food items positioned on the ends of the shish-kebob.

Figure 3:
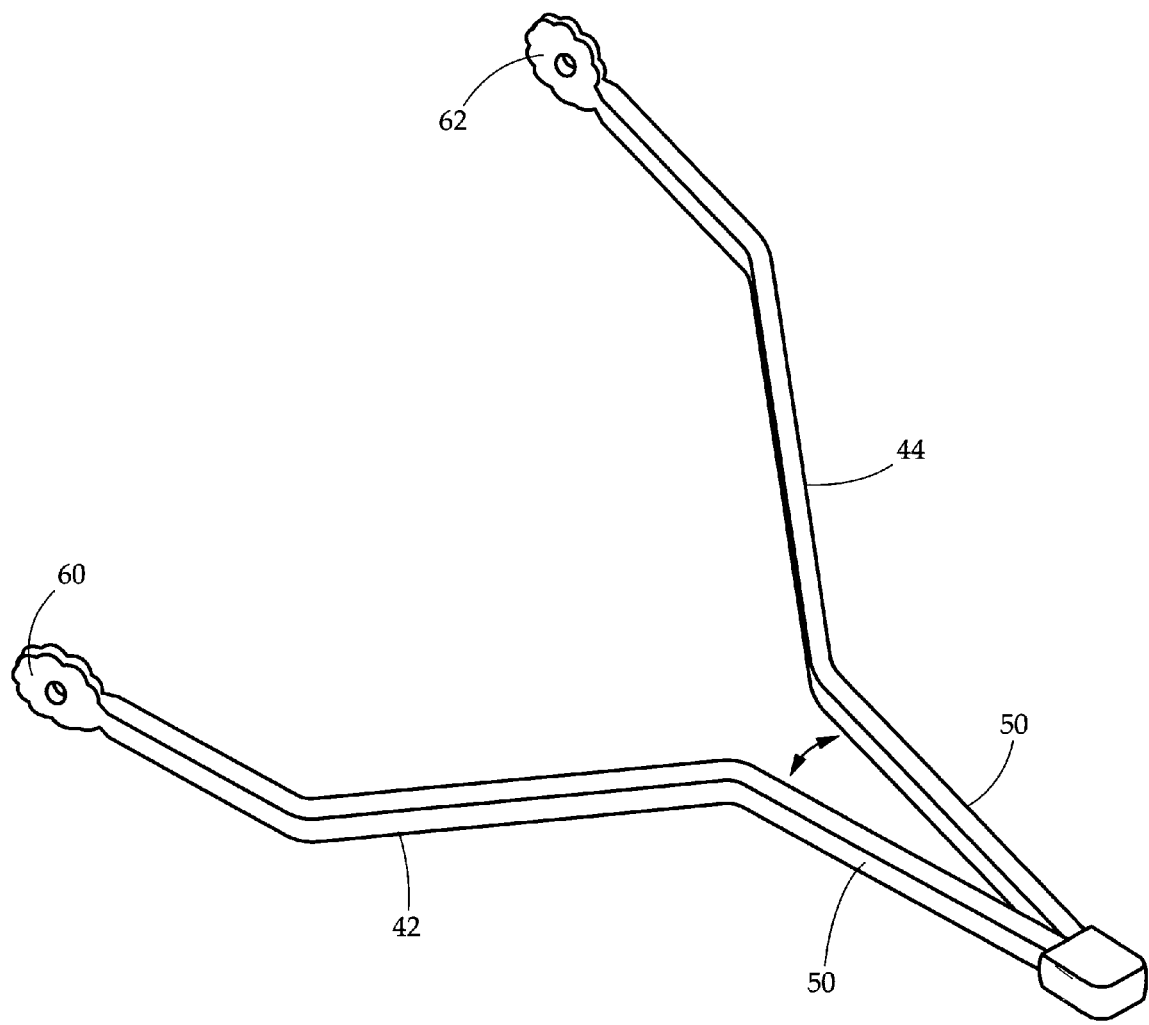
FIG. 3 is a perspective view of the shish-kebob tong of the present invention.

FIG. 3 is a perspective view of the shish-kebob tong 40, shown in an operating position, with the handles no longer in parallel relationship, but in an open relationship allowing the shish-kebob engaging ends 60 and 62 of the arms 42 and 44 to engage a skewer 12 and the shish-kebob 10. The amount of opening of the shish-kebob tongs may vary. Most shish-kebob skewers have a length of from between 9 inches and 14 inches, although longer shish-kebob skewers are available. Therefore, the opening of the shish-kebob tongs must be sufficient to accommodate a skewer between 9 and 14 inches so the distance between the shish-kebob engaging ends of the shish-kebob tong should be capable of spanning this distance.

Figure 4:
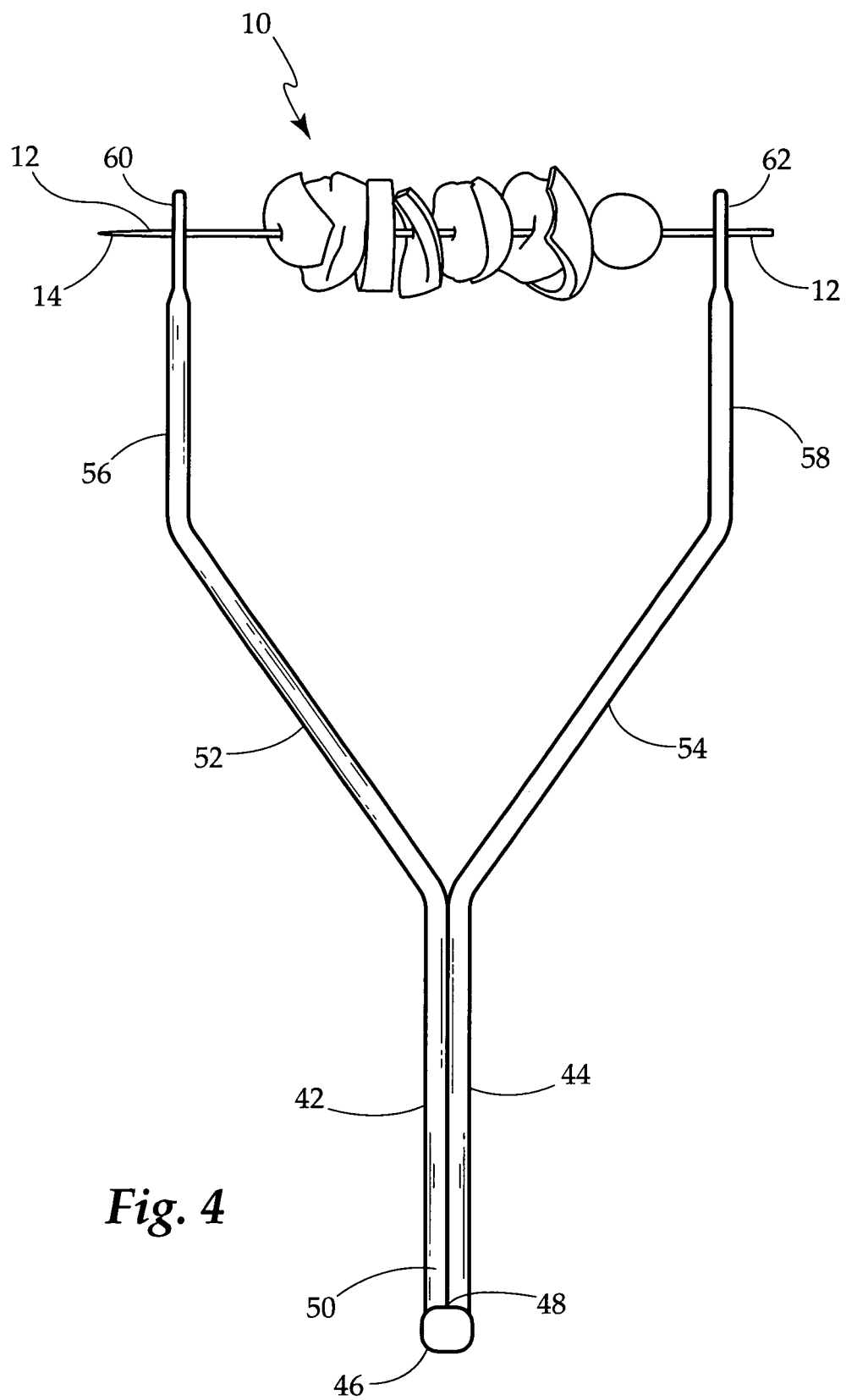
FIG. 4 is a top view of the shish-kebob tong of the present invention engaged with a shish-kebob.

FIG. 4 is a top view of the shish-kebob tong of the present invention engaged with a skewer and shish-kebob after having been opened in accordance with the illustration shown in FIG. 3 and then engaged with the skewer and shish-kebob. It will be noted that the skewer extends through the shish-kebob engaging ends of the shish-kebob tongs, and that shish-kebob engaging ends have contacted the outermost pieces of food located on the skewer and slightly compress the food items. This allows the chef or user to facilely lift the skewer and food items and rotate the shish-kebob tongs 180 degrees in his hand and in so doing rotating the shish-kebob 180 degrees to replace it on the grilling grate 26 in order to uniformly cook the opposing side of the shish-kebob. Once so positioned, the release of pressure on the handle 50 of the shish-kebob tong 40 allows the spring activated hinge to extend the arms 42 and 44 away from each other so that the tongs can be removed from the shish-kebob.

Figure 5:
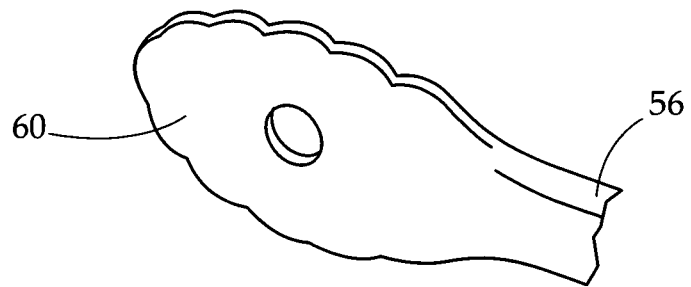
FIG. 5 is a perspective view of a shish-kebob tong of the present invention.
Figure 6:
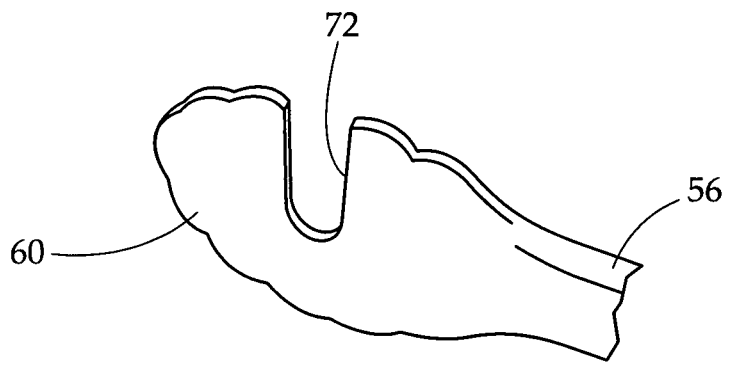
FIG. 6 is a perspective view of a second embodiment of a shish-kebob tong of the present invention.
Figure 7:
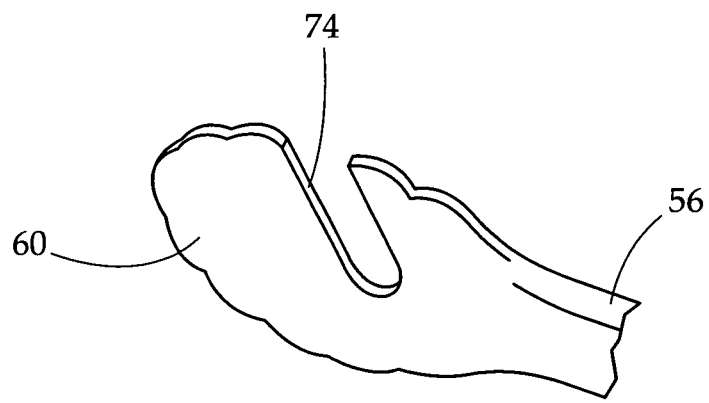
FIG. 7 is a perspective view of a third embodiment of the shish-kebob tong of the present invention.

FIGS. 5, 6, and 7 are perspective views of the shish-kebob engaging ends 60 and 62 of the shish-kebob tongs 40 illustrating the manner in which the shish-kebob engaging end 60 and 62 engages the skewer 12 for performing the task as described. FIG. 5 illustrates the shish-kebob engaging end 60 having an aperture there through which is slideably engageable with the opposing ends of skewer 12 for lifting the skewer. FIG. 6 illustrates a shish-kebob engaging end 60 in which a U-shaped vertical slot 72 is formed in the shish-kebob engaging end, allowing the skewer to pass into the slot and the shish-kebob engaging ends then contacting and slightly compressing the end food items on the skewer for the repositioning.

FIG. 7 illustrates a shish-kebob engaging end 60 in which a U-shaped slot 74 is angled either towards the handle of the shish-kebob tongs 40, or away from the shish-kebob handle. In this embodiment, the skewer passes through the slot, and the slot aids in maintaining the skewer during the rotation and repositioning process.

Therefore, while the present invention has been disclosed with respect to the preferred embodiments thereof, it will be recognized by those of ordinary skill in the art that various changes and modifications can be made without departing from the spirit and scope of the invention. It is therefore manifestly intended that the invention be limited only by the claims and the equivalence thereof.

I claim:

1. Tongs for manipulating shish kabob on a barbeque grill, a shish kabob comprising an elongate skewer having food portions selectively removably positioned thereon, said shish kabob positioned on a barbecue grill in a generally horizontal orientation, the tongs comprising:
   in a closed orientation, two opposing arms in articulating relationship joined together at a first pivot end, said opposing arms extending from said first end initially in parallel abutting relationship before angularly diverging and then converging to a parallel spaced apart relationship, each terminating in a second end, said second ends in parallel spaced apart relationship with each other, said second ends formed with shish kabob engaging members for engagement with exposed extended ends of said horizontally oriented skewers of said shish kabob, said members engaging said skewer and frictionally engaging outer food portions positioned on said skewer and preventing their rotation as said skewer and said shish kabob are flipped from side to side for even cooking and for removal from the grill.

2. The tongs for manipulating shish kabob in accordance with claim 1 wherein said skewer engaging members comprise an aperture through each said member for passage of exposed ends of said skewer allowing shish kabob engaging members to contact and compress food portions.

3. The tongs for manipulating shish kabob on a barbeque grill in accordance with claim 1 wherein said shish kabob engaging members having a slot formed in each of said shish kabob engaging member, said slot extending inwardly from a peripheral edge of said second end for the slidable engagement of exposed skewer ends of said skewer of a shish kabob, each slot in alignment with each other.

4. The tongs for manipulating shish kabob on a barbeque grill in accordance with claim 3 wherein said slot is perpendicular to said arms of said tongs.

5. The tongs for manipulating shish kabob on a barbeque grill in accordance with claim 3 wherein said slot is in angular relationship with respect to said arms of said tongs.

6. The tongs for manipulating shish kabob on a barbeque grill in accordance with claim 1 wherein said two opposing arms in articulate relationship joined together at a first end are formed with a locking means at said first end of said two opposing arms to selectively maintain said tongs in a locked closed position.

7. The tongs for manipulating shish kabob on a barbeque grill in accordance with claim 1 wherein said second ends in parallel relationship of said two opposing arms are in spaced apart parallel relationship sufficient to engage said exposed extended skewer ends of said shish kabob and said outer food portions positioned on said skewer, said opposing arms of sufficient length to extend over barbecue grill.

* * * * *